US011949167B2

(12) United States Patent
Shu et al.

(10) Patent No.: US 11,949,167 B2
(45) Date of Patent: Apr. 2, 2024

(54) ANTENNA TERMINAL WITH POWER SUPPLY AND SINGLE FEED COMBINATION

(71) Applicant: ZTE CORPORATION, Guangdong (CN)

(72) Inventors: Chaofan Shu, Guangdong (CN); Yang Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 188 days.

(21) Appl. No.: 17/609,393

(22) PCT Filed: Sep. 28, 2020

(86) PCT No.: PCT/CN2020/118375

§ 371 (c)(1),
(2) Date: Nov. 7, 2021

(87) PCT Pub. No.: WO2021/068784

PCT Pub. Date: Apr. 15, 2021

(65) Prior Publication Data

US 2022/0190490 A1 Jun. 16, 2022

(30) Foreign Application Priority Data

Oct. 8, 2019 (CN) ......................... 201910951453.5

(51) Int. Cl.

| | |
|---|---|
| ***H01Q 21/30*** | (2006.01) |
| ***H01Q 1/38*** | (2006.01) |
| ***H01Q 5/00*** | (2015.01) |
| ***H01Q 5/335*** | (2015.01) |
| ***H01Q 9/04*** | (2006.01) |
| ***H01Q 9/42*** | (2006.01) |

(52) U.S. Cl.
CPC .................................. *H01Q 21/30* (2013.01)

(58) Field of Classification Search
CPC ............ H01Q 21/30; H01Q 5/00; H01Q 9/04; H01Q 1/38; H01Q 9/42; H01Q 1/243; H01Q 5/0003; H03H 7/38
See application file for complete search history.

(56) References Cited

U.S. PATENT DOCUMENTS

2011/0198398 A1* 8/2011 Itay ........................ H01Q 1/521
343/866

FOREIGN PATENT DOCUMENTS

CN 110165399 A 8/2019

OTHER PUBLICATIONS

Author: Single-Port Feeding Dual-Frequency Antenna and Electronic Device, Date: May 29, 2019; p. 1-24 (Year: 2019).*

(Continued)

*Primary Examiner* — Wei (Victor) Y Chan

(74) *Attorney, Agent, or Firm* — Li & Cai Intellectual Property (USA) Office

(57) ABSTRACT

Provided in the present disclosure are an antenna, an antenna power supply method, a single-feeding-based method for combining antennas, and a terminal. The antenna comprises: a low-frequency antenna, a high-frequency antenna, and a filter. The filter is provided between the low-frequency antenna and the high-frequency antenna and isolates the low-frequency antenna and the high-frequency antenna. The low-frequency antenna and the high-frequency antenna use the same feeding point for feeding.

17 Claims, 11 Drawing Sheets

(56) References Cited

OTHER PUBLICATIONS

International search report of PCT Patent Application No. PCT/CN2020/118375 dated Dec. 30, 2020.
Japan Patent Office, Third Office Action dated Dec. 5, 2023 for application No. JP2021-566353.
Nishimura Yoshini: "Design a 1.2 GHz low-pass filter using free tools", Design Wave Magazine Apr. 2008, Year: 2008, pp. 107-108.

* cited by examiner

ANTENNA TERMINAL WITH POWER SUPPLY AND SINGLE FEED COMBINATION

CROSS-REFERENCE TO RELATED APPLICATIONS

This application claims the priority of Chinese patent application CN 201910951453.5, entitled “Antenna, Method for Supplying Power to Antenna, Single-Feeding-Based Method for Combining Antennas, and Terminal” and filed on Oct. 8, 2019, the entirety of which is incorporated herein by reference.

FIELD OF THE INVENTION

The present disclosure relates to (but not limited to) the field of 5G, communications and antennas.

BACKGROUND OF THE INVENTION 5G has come to an end of a standard setting phase, and various large-scale operators are actively deploying 5G devices. There is no doubt that 5G brings about a brand new experience to users, has a transmission rate ten times faster than 4G, and has new requirements for an antenna system. In 5G communication, the key to a high rate is the millimeter wave and beamforming technology. However, a traditional antenna cannot meet this requirement, obviously. The deployment of a 5G network determines that a terminal product needs to support both 4G communication and 5G communication during a transition period, which means a low-frequency antenna, such as a 2G/3G/4G antenna and a sub-6G antenna (i.e. operating below 6 GHz), and a 5G millimeter wave array antenna are both present in one terminal product.

With respect to the problem of coexistence of a low-frequency antenna and a high-frequency antenna, there are mainly two common solutions: first, a 5G array antenna and a low-frequency antenna are located in different clearance areas of a terminal product, which means a larger clearance area that is detrimental to the miniaturization of a terminal; and second, the 5G array antenna and the low-frequency antenna are located in the same clearance area, and respectively use different feeding systems, which means two sets of antenna systems that limit choices of a circuit solution. An existing solution requires the low-frequency antenna and the high-frequency antenna to occupy a larger clearance area, or to use different feeding systems, which limits the diversification of a terminal hardware solution, and is not applicable to a small terminal.

SUMMARY OF THE INVENTION

According to one embodiment of the present disclosure, an antenna is provided, comprising: a low-frequency antenna, which comprises an antenna having a working band lower than 6 GHz; a high-frequency antenna, which comprises an array antenna that works at a millimeter wave band; and a filter. The low-frequency antenna and the high-frequency antenna are fed by the same feeding point. The filter is arranged between the low-frequency antenna and the high-frequency antenna and isolates the low-frequency antenna and the high-frequency antenna.

According to one embodiment of the present disclosure, a method for supplying power to an antenna is provided, the method comprising: when a low-frequency antenna works, a filter filters out an interference signal from a high-frequency antenna, and meanwhile the power is supplied to the low-frequency antenna; and when the high-frequency antenna works, the filter prevents the power supply to the low-frequency antenna.

According to one embodiment of the present disclosure, a single-feeding-based method for combining antennas is provided, the method comprising: realizing the combination of a low-frequency antenna and a high-frequency antenna on the basis of a single feeding point by using a filter.

According to one embodiment of the present disclosure, a terminal is provided, comprising the antenna of the present disclosure.

BRIEF DESCRIPTION OF THE DRAWINGS

The accompanying drawings described herein are intended to provide a further understanding of the present disclosure, which constitute a part of the present application. The illustrative embodiments of the present disclosure and the description thereof are for explaining the present disclosure and do not constitute an improper limitation of the present disclosure. In the accompanying drawings.

DETAILED DESCRIPTION OF THE EMBODIMENTS

Figure 1:
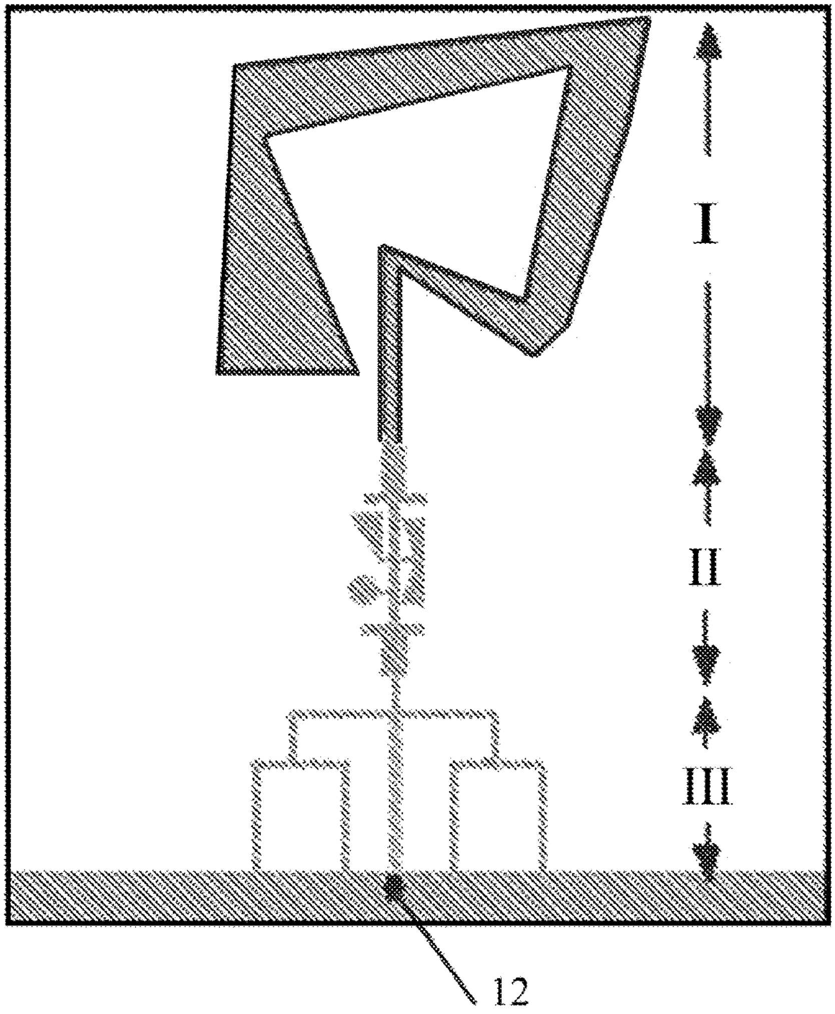
FIG. 1 is a front view of an antenna structure of an embodiment of the present disclosure.
Figure 2:
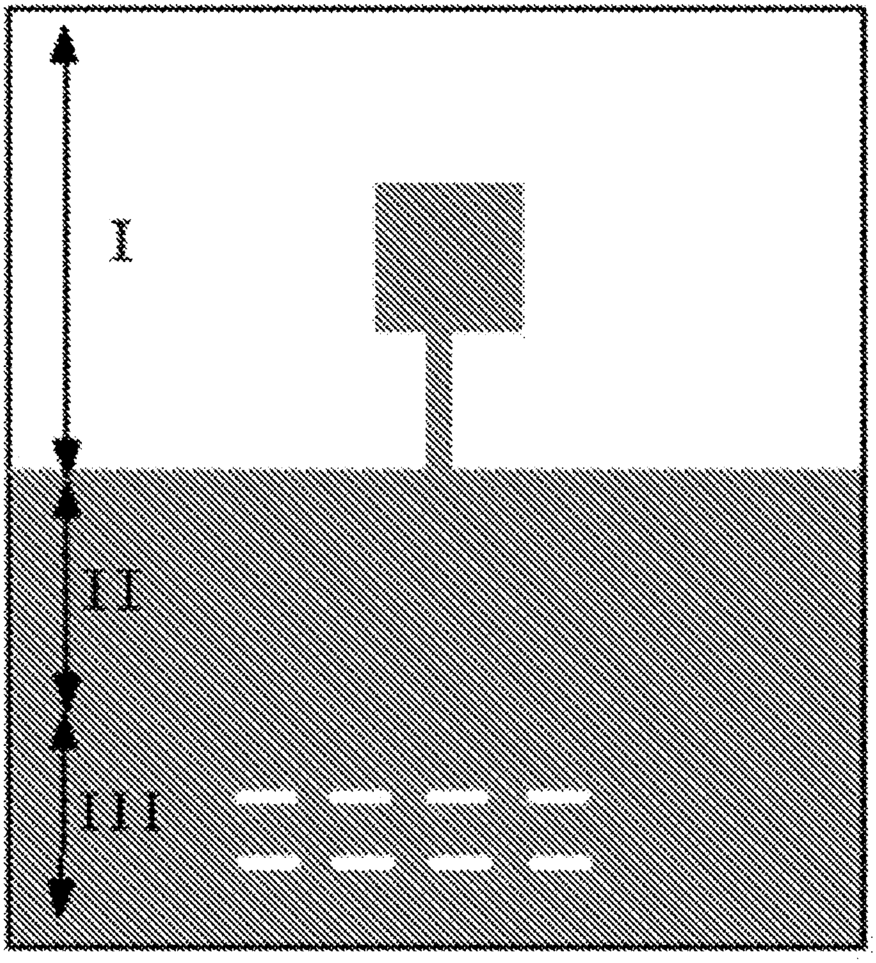
FIG. 2 is a back view of an antenna structure of an embodiment of the present disclosure.

The embodiments of the present disclosure provide an antenna, a method for supplying power to an antenna, a single-feeding-based method for combining antennas, and a terminal. According to an embodiment of the present disclosure, an antenna is provided. FIG. 1 is a front view of an antenna structure of an embodiment of the present disclosure. FIG. 2 is a back view of an antenna structure of an embodiment of the present disclosure. As shown in FIG. 1 and FIG. 2, the antenna of an embodiment of the present disclosure comprises: a low-frequency antenna (part I), a high-frequency antenna (part III), and a filter (part II) arranged between the low-frequency antenna and the high-frequency antenna.

The low-frequency antenna comprises an antenna having a working band lower than 6 GHz. As shown in FIG. 1 and FIG. 2, an example of the low-frequency antenna, i.e. part I, in the figures is a bending triangular patch antenna and a feeding system thereof for providing low-frequency resonance.

The filter is arranged between the low-frequency antenna and the high-frequency antenna and isolates the low-frequency antenna and the high-frequency antenna. As shown in FIG. 1 and FIG. 2, part II is a schematic diagram of an asymmetric low-pass filter formed by a compact microstrip resonance unit and is located between the low-frequency antenna and the 5G array antenna.

The high-frequency antenna comprises an array antenna that works at a millimeter wave band. The low-frequency antenna and the high-frequency antenna are fed by the same feeding point 12. As shown in FIG. 1 and FIG. 2, an example of the high-frequency antenna, i.e. part III, in the figures is a 5G slot array antenna and a feeding system thereof.

Figure 3:
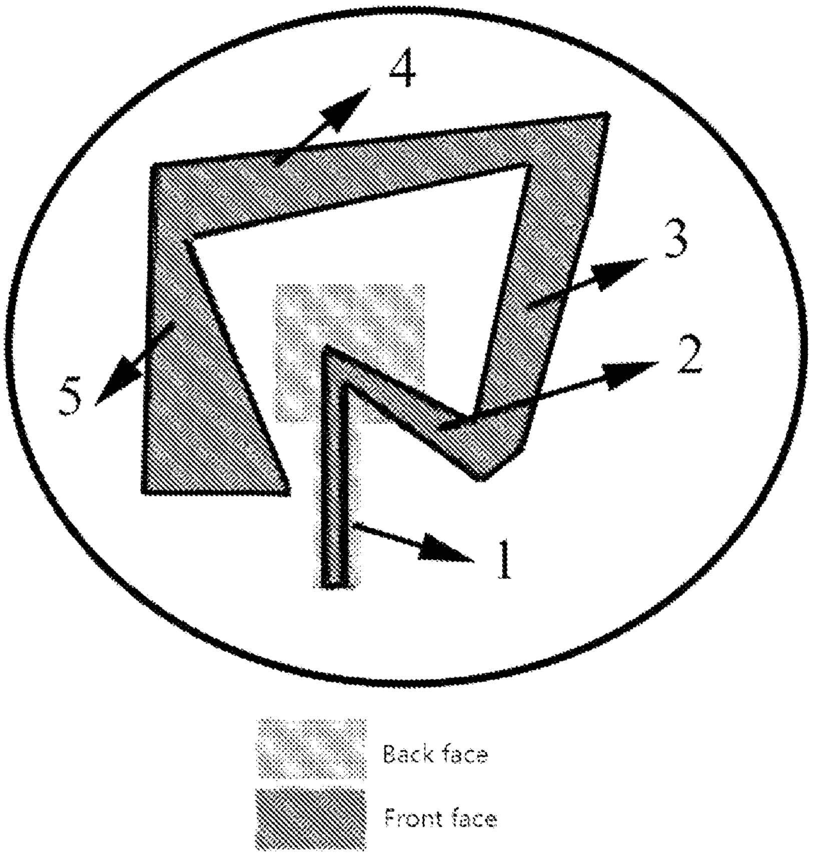
FIG. 3 is a schematic diagram of a low-frequency antenna of an embodiment of the present disclosure.

According to an embodiment of the present disclosure, the low-frequency antenna comprises an antenna having a working band lower than 6 GHz. FIG. 3 is a schematic diagram of a low-frequency antenna of an embodiment of the present disclosure. As shown in FIG. 3, the low-frequency antenna in the figure is a compact antenna as an example, which is formed by four planar folded dipole antennas 2, 3, 4, 5 that serve as radiation elements of a square array, and a microstrip feeding structure 1 thereof. In order to realize a wide bandwidth, a folded dipole antenna can be selected.

Figure 4:
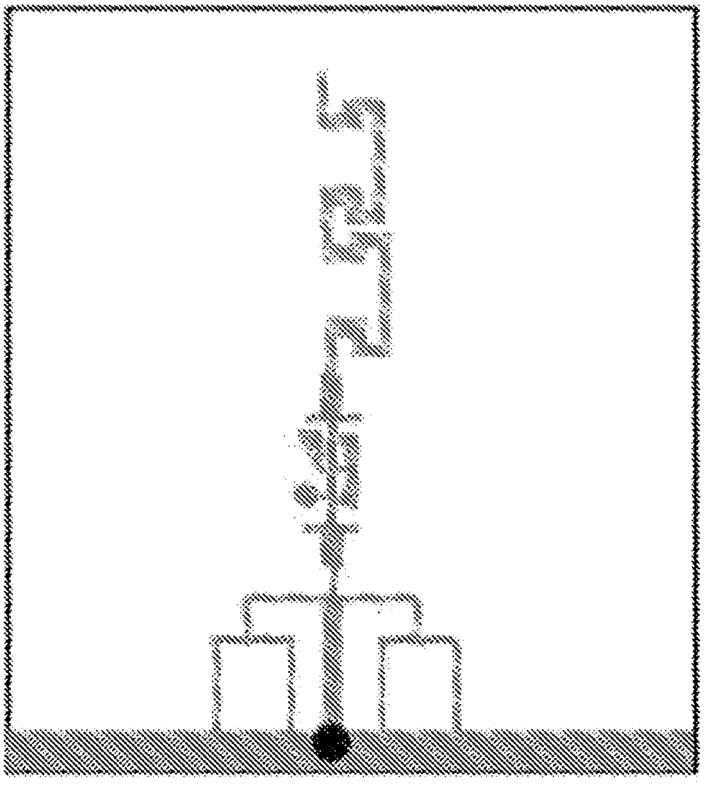
FIG. 4 is a schematic front view of a low-frequency antenna of a Franklin antenna according to an embodiment of the present disclosure.
Figure 5:
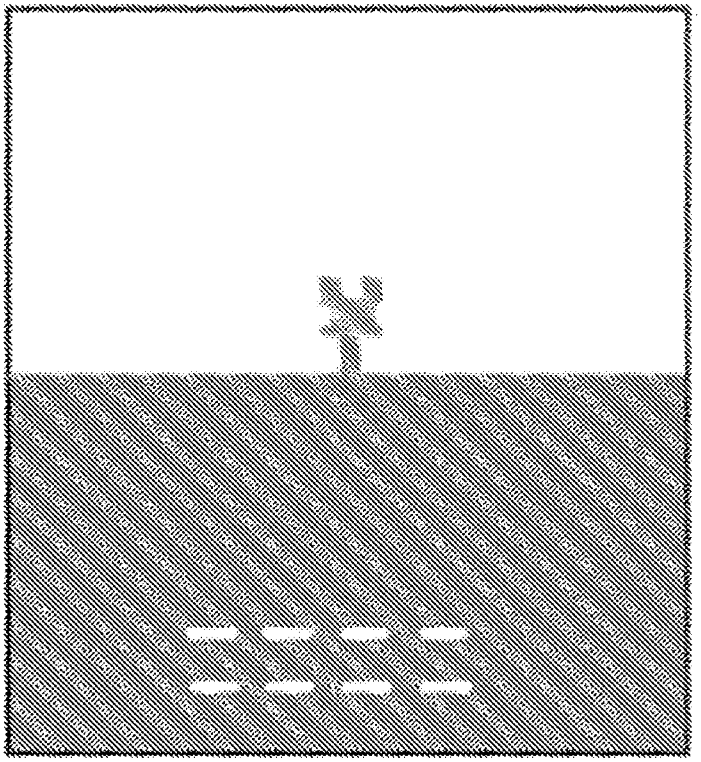
FIG. 5 is a schematic back view of a low-frequency antenna of a Franklin antenna according to an embodiment of the present disclosure.
Figure 6:
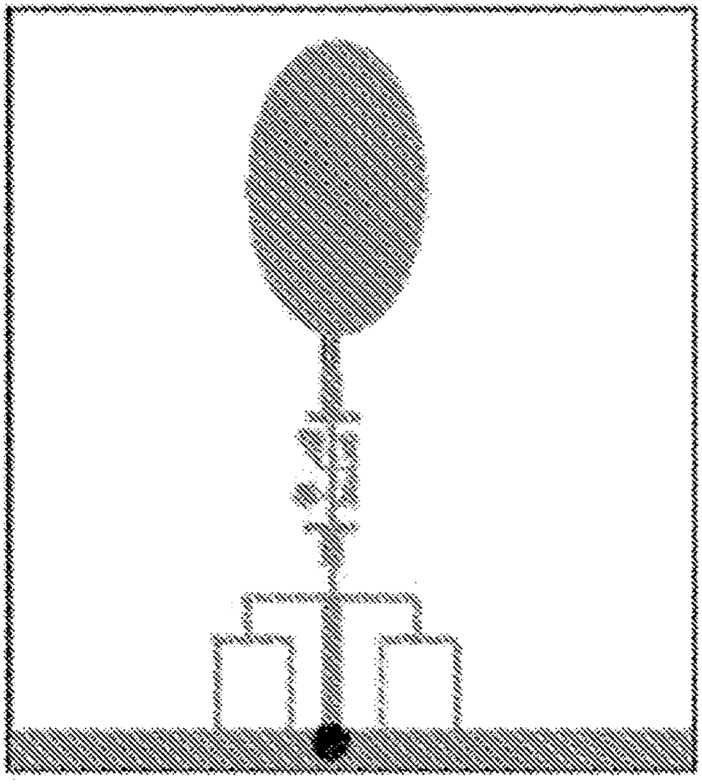
FIG. 6 is a schematic font view of a low-frequency antenna of a microstrip antenna according to an embodiment of the present disclosure.
Figure 7:
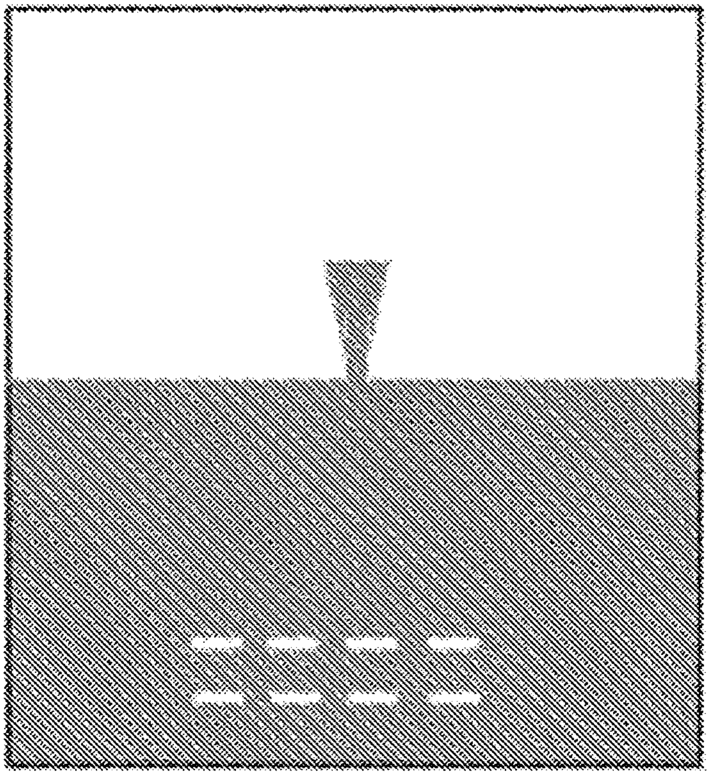
FIG. 7 is a schematic back view of a low-frequency antenna of a microstrip antenna according to an embodiment of the present disclosure.

In addition to the bending triangular patch antenna as shown in FIG. 3, the low-frequency antenna can also be realized in forms of other antennas, such as a doublet antenna, a Franklin monopole antenna, etc. FIG. 4 to FIG. 7 illustrate examples of an alternative solution. FIG. 4 is a schematic front view of a low-frequency antenna of a Franklin antenna according to an embodiment of the present disclosure. FIG. 5 is a schematic back view of a low-frequency antenna of a Franklin antenna according to an embodiment of the present disclosure. FIG. 6 is a schematic font view of a low-frequency antenna of a microstrip antenna according to an embodiment of the present disclosure. FIG. 7 is a schematic back view of a low-frequency antenna of a microstrip antenna according to an embodiment of the present disclosure.

Figure 8:
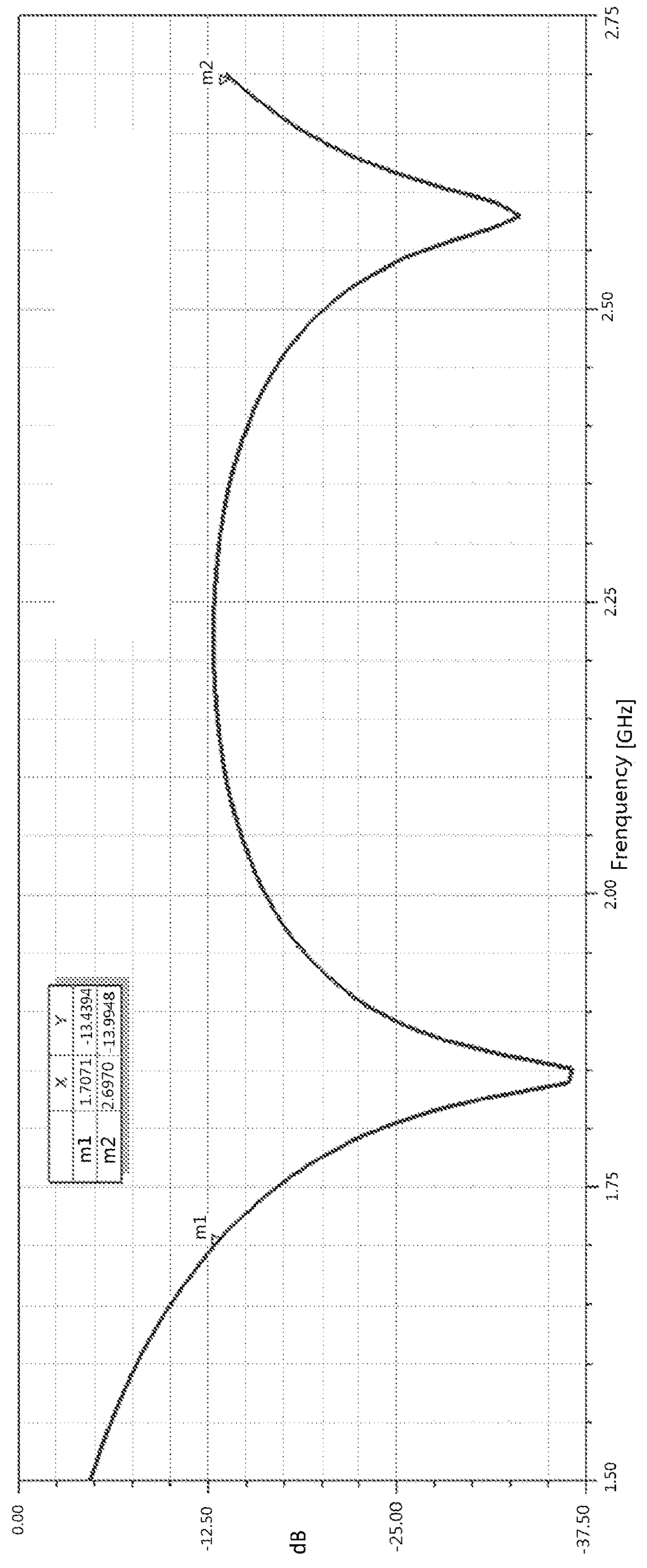
FIG. 8 is a schematic diagram of a reflection coefficient of a low-frequency antenna of a bending triangular antenna according to an embodiment of the present disclosure.

A wide band can be realized by adjusting a folded dipole element according to a working band, and a folded dipole unit structure can compensate for a mutual coupling effect, thereby improving the bandwidth and radiation performance of an antenna. An echo loss bandwidth of −5 dB obtained through simulation and a test is approximately greater than 40% (1.7-2.69 GHz). FIG. 8 is a schematic diagram of a reflection coefficient of a low-frequency antenna of a bending triangular antenna according to an embodiment of the present disclosure. As shown in FIG. 8, omnidirection is realized within the entire range of the working band, a variation of a gain is less than 2 dB, and the out-of-roundness of an antenna pattern is less than 1 dB.

Figure 9:
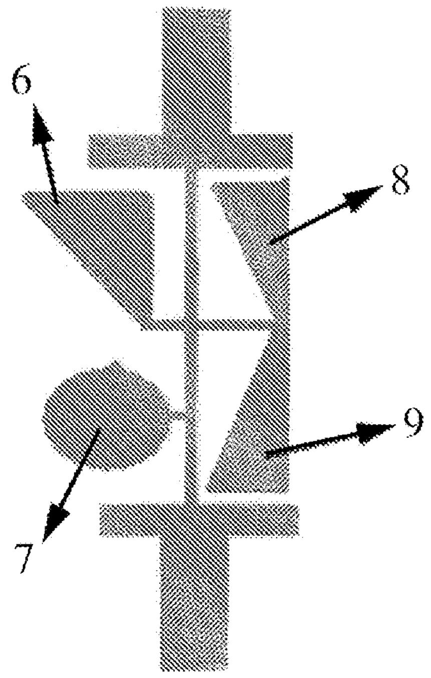
FIG. 9 is a schematic diagram of a low-pass filter of an embodiment of the present disclosure.
Figure 10:
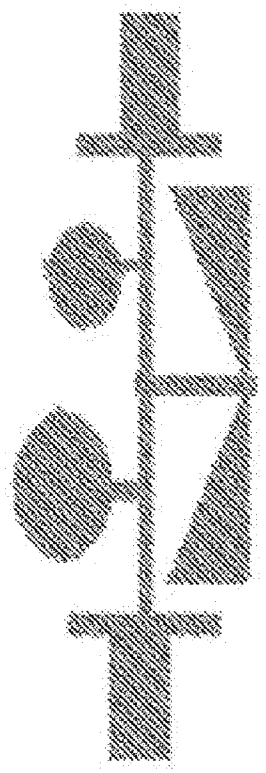
FIG. 10 is another schematic diagram of the low-pass filter of the embodiment of the present disclosure.
Figure 11:
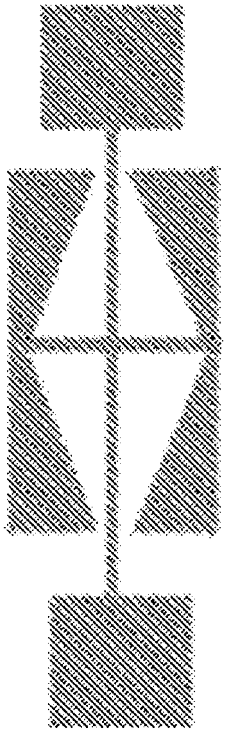
FIG. 11 is another schematic diagram of the low-pass filter of the embodiment of the present disclosure.
Figure 12:
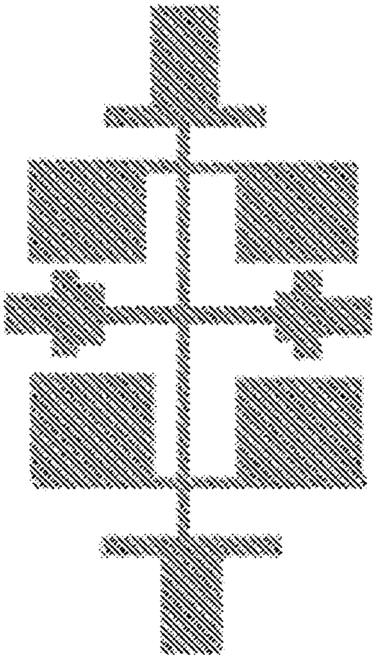
FIG. 12 is another schematic diagram of the low-pass filter of the embodiment of the present disclosure.

According to an embodiment of the present disclosure, the filter comprises a low-pass filter for isolating the low-frequency antenna and the high-frequency antenna. FIG. 9 is a schematic diagram of a low-pass filter of an embodiment of the present disclosure. As shown in FIG. 9, the low-pass filter comprises four open circuits 6, 7, 8, 9. According to the other embodiments of the present disclosure, the low-pass filter can also be in other forms. FIG. 10 to FIG. 12 are schematic diagrams of the specific low-pass filters in other forms of the embodiments of the present disclosure.

Figure 13:
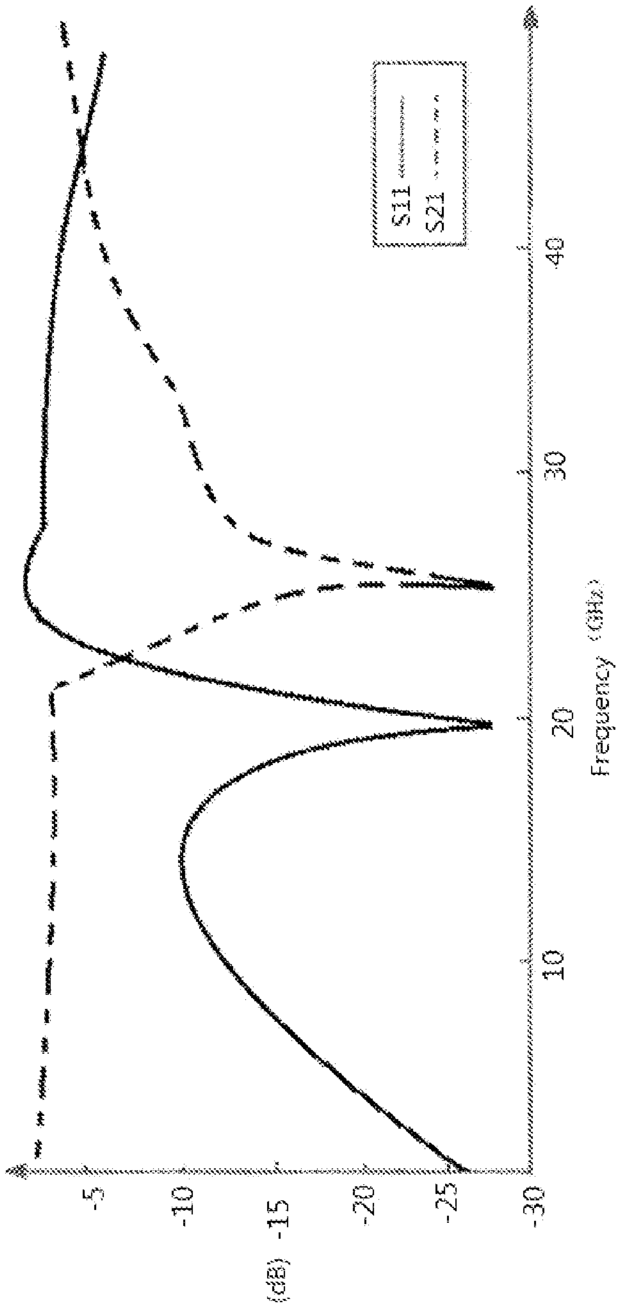
FIG. 13 is a schematic diagram of a working characteristic of a compact microstrip low-pass filter of an embodiment of the present disclosure.

The low-pass filter allows the power supply to the low-frequency antenna (e.g. a triangular bending antenna) at a low band, and when the high-frequency antenna works, the low-pass filter serves as an open circuit so as to prevent the power supply to the low-frequency antenna, thereby realizing that two antenna systems can separately work in the case of a single feeding point. The specific structure of a resonance unit of the low-pass filter is as shown in FIG. 9. The range of a low-pass frequency can be reduced by adjusting primary parameters, such that the low-pass filter works at an expected working band. Performing tuning by using four open circuits can have the function of bandwidth expansion, such that the filter has a relatively low insertion loss within a wide-passband range, and has a great attenuation characteristic within a wide-stopband range. FIG. 13 is a schematic diagram of a working characteristic of a compact microstrip low-pass filter of an embodiment of the present disclosure.

Figure 14:
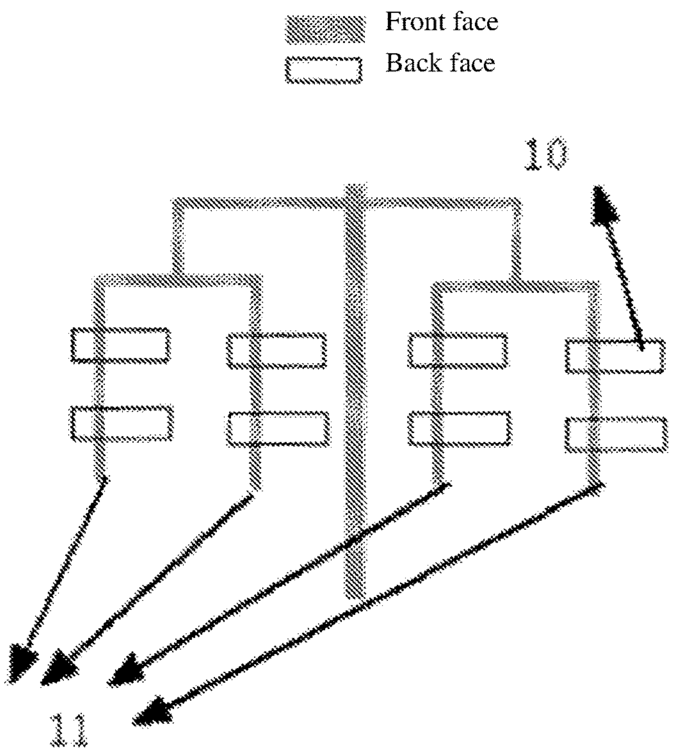
FIG. 14 is a schematic diagram of a high-frequency antenna of an embodiment of the present disclosure.
Figure 15:
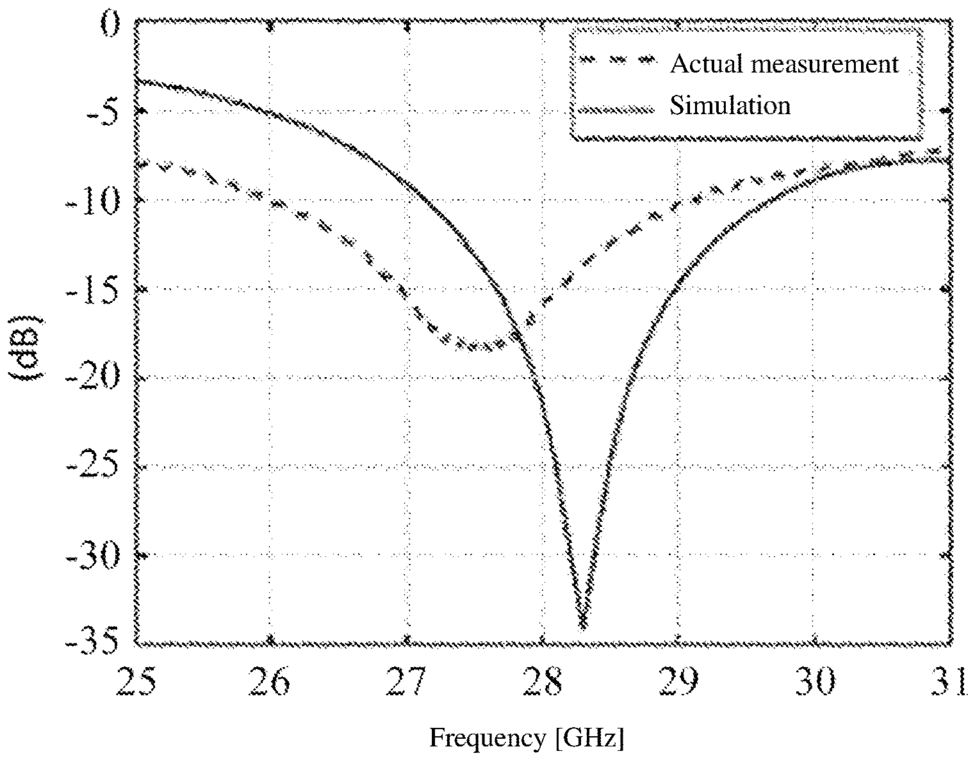
FIG. 15 is a simulation schematic diagram of a high-frequency antenna of a slot array antenna according to an embodiment of the present disclosure.

According to an embodiment of the present disclosure, the high-frequency antenna comprises an array antenna that works at a millimeter wave band, comprising a millimeter wave array antenna, a slot array antenna, and an array formed by patch antennas or other types of antennas. FIG. 14 is a schematic diagram of a high-frequency antenna of an embodiment of the present disclosure. As shown in FIG. 14, a 2×4 slot antenna 10 is used as a 5G millimeter wave array antenna, a slot length is the half-wavelength of the working band, coupling feeding is used, and the slot antenna 10 is fed by four parallel microstrip antennas 11. The distance between the four parallel microstrip antennas 11 and the width of each microstrip antenna 11 can be adjusted according to the working band, so as to satisfy impedance matching. It is shown by the simulation that a better impedance characteristic can be obtained when the feeding point is at a distance of 0.05 wavelength from a short slot edge. FIG. 15 is a simulation schematic diagram of a high-frequency antenna of a slot array antenna according to an embodiment of the present disclosure.

According to an embodiment of the present disclosure, an antenna system merely comprises one feeding point. As shown in FIG. 1, the antenna system comprises a single feeding point 12, and uses a filter. The coexistence of the high-frequency antenna and the low-frequency antenna in the same clearance area is realized by using the mutual offsetting principle of opposite phases of an electromagnetic wave.

Figure 16:
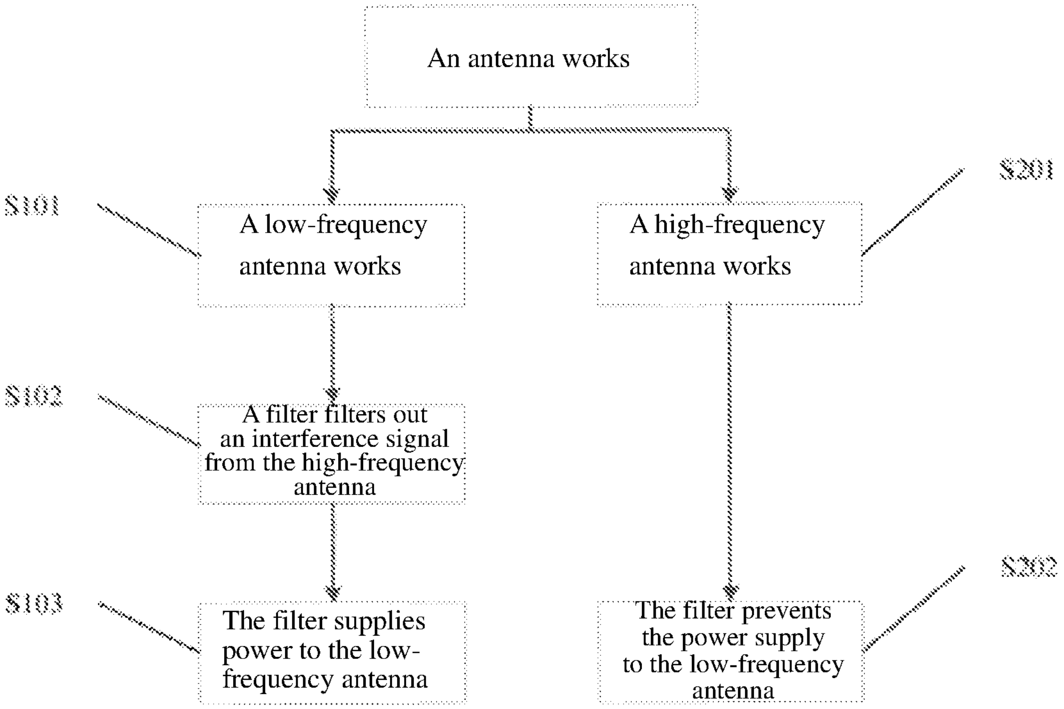
FIG. 16 is a schematic diagram of a method for supplying power to an antenna of an embodiment of the present disclosure.

According to one embodiment of the present disclosure, a method for supplying power to an antenna on the basis of the above-mentioned antenna is provided. FIG. 16 is a schematic diagram of a method for supplying power to an antenna of an embodiment of the present disclosure. As shown in FIG. 16, the method for supplying power to an antenna of the embodiment of the present disclosure comprises the following steps S101 to S202.

At step S101, a low-frequency antenna works.

At step S102, a filter filters out an interference signal from a high-frequency antenna.

At step S103, power is supplied to the low-frequency antenna.

At step S201, a high-frequency antenna works.

At step S202, the filter prevents the power supply to the low-frequency antenna.

According to one embodiment of the present disclosure, a method for realizing the single-feeding-based combination of a high-frequency antenna and a low-frequency antenna on the basis of the above-mentioned antenna is provided, the method comprising: realizing the combination of a low-frequency antenna and a high-frequency antenna on the basis of a single feeding point and using a filter.

According to one embodiment of the present disclosure, a terminal is provided, comprising the above-mentioned antenna.

According to the antenna, the method for supplying power to an antenna, the single-feeding-based method for combining antennas, and the terminal provided by the embodiments of the present disclosure, a filter is arranged between the low-frequency antenna and the high-frequency antenna and isolates the low-frequency antenna and the high-frequency antenna, so as to realize the coexistence of the low-frequency antenna and the high-frequency antenna in the same clearance area by a single feeding point. A smaller space is occupied as much as possible in order to meet a requirement for a small terminal size, alleviating the defect of an existing technique.

The foregoing description is merely illustrative of the preferred embodiments of the present disclosure and is not intended to limit the present disclosure, and various changes and modifications in the present disclosure may be made by those skilled in the art. Within the spirit and principle of the present disclosure, any modifications, equivalent replacements, improvements, etc., shall be comprised within the protection scope of the present disclosure.

The invention claimed is:

1. A antenna, comprising:

a low-frequency antenna, comprising an antenna having a working band lower than 6 GHz;

a high-frequency antenna, comprising an array antenna that works at a millimeter wave band, wherein the low-frequency antenna and the high-frequency antenna are fed by the same feeding point; and a low-pass filter arranged between the low-frequency antenna and the high-frequency antenna for isolating the low-frequency antenna and the high-frequency antenna, wherein the low-pass filter comprises at least one open circuit, and in a case where power supply comprises both high-frequency signals and low-frequency signals and when the high-frequency antenna works, the low-pass filter serves as an open circuit so as to prevent the power supply to the low-frequency antenna.

2. The antenna of claim 1, wherein the array antenna comprises at least one of the following:

a millimeter wave array antenna;

a slot array antenna with a slot length of a half-wavelength of a working band; and an array formed by patch antennas or other types of antennas.

3. The antenna of claim 1, wherein the antenna merely comprises one feeding point.

4. A method for supplying power to the antenna of claim 1, the method comprising: when the low-frequency antenna works, the low-pass filter filters out an interference signal from the high-frequency antenna, and meanwhile the power is supplied to the low-frequency antenna; and in a case where power supply comprises both high-frequency signals and low-frequency signals and when the high-frequency antenna works, the low-pass filter prevents the power supply to the low-frequency antenna.

5. A terminal, comprising the antenna of claim 1.

6. The method of claim 4, wherein the array antenna comprises at least one of the following:

a millimeter wave array antenna;

a slot array antenna with a slot length of a half-wavelength of a working band; and an array formed by patch antennas or other types of antennas.

7. The method of claim 4, wherein the antenna merely comprises one feeding point.

8. The terminal of claim 5, wherein the array antenna comprises at least one of the following:

a millimeter wave array antenna;

a slot array antenna with a slot length of a half-wavelength of a working band; and an array formed by patch antennas or other types of antennas.

9. The terminal of claim 5, wherein the antenna merely comprises one feeding point.

10. The antenna of claim 1, wherein the low-pass filter is an asymmetric low-pass filter formed by a compact microstrip resonance unit.

11. The antenna of claim 1, wherein the low-frequency antenna comprises at least one of the following:

a bending triangular patch antenna;

a doublet antenna; and a Franklin monopole antenna.

12. The antenna of claim 1, wherein the low-frequency antenna a compact antenna formed by four planar folded dipole antennas as radiation elements of a square array and a microstrip feeding structure.

13. The antenna of claim 3, wherein the feeding point is at a distance of 0.05 wavelength from a short slot edge of a slot array antenna as the high-frequency antenna.

14. The terminal of claim 5, wherein the low-pass filter is an asymmetric low-pass filter formed by a compact microstrip resonance unit.

15. The terminal of claim 5, wherein the low-frequency antenna comprises at least one of the following:

a bending triangular patch antenna;

a doublet antenna; and a Franklin monopole antenna.

16. The terminal of claim 5, wherein the low-frequency antenna a compact antenna formed by four planar folded dipole antennas as radiation elements of a square array and a microstrip feeding structure.

17. The terminal of claim 9, wherein the feeding point is at a distance of 0.05 wavelength from a short slot edge of a slot array antenna as the high-frequency antenna.

* * * * *